US012541875B2

(12) United States Patent
Tanabe

(10) Patent No.: US 12,541,875 B2
(45) Date of Patent: Feb. 3, 2026

(54) CAMERA LOCATION ESTIMATION APPARATUS, METHOD AND STORAGE MEDIUM

(71) Applicant: KABUSHIKI KAISHA TOSHIBA, Tokyo (JP)

(72) Inventor: Yasuki Tanabe, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 35 days.

(21) Appl. No.: 18/592,091

(22) Filed: Feb. 29, 2024

(65) Prior Publication Data

US 2025/0014217 A1   Jan. 9, 2025

(30) Foreign Application Priority Data

Jul. 6, 2023   (JP) .................................. 2023-111588

(51) Int. Cl.
*G06T 7/73* (2017.01)
*G06T 7/20* (2017.01)

(52) U.S. Cl.
CPC .................. *G06T 7/74* (2017.01); *G06T 7/20* (2013.01); *G06T 2207/30196* (2013.01); *G06T 2207/30244* (2013.01)

(58) Field of Classification Search
CPC ... G06T 7/74; G06T 7/20; G06T 2207/30196; G06T 2207/30244
See application file for complete search history.

(56) References Cited

U.S. PATENT DOCUMENTS

| 10,495,661 B2* | 12/2019 | Tu .............................. G01P 3/36 |
| 11,700,448 B1* | 7/2023 | Cogliandro ............ H04N 7/183 |
| | | 348/207.11 |
| 2004/0219978 A1* | 11/2004 | Teramoto ................ A63F 13/45 |
| | | 463/6 |
| 2008/0285808 A1* | 11/2008 | Chang .................... H04N 7/012 |
| | | 382/300 |

(Continued)

FOREIGN PATENT DOCUMENTS

| EP | 2933790 | * 11/2013 |
| JP | 2014-216813 A | 11/2014 |

OTHER PUBLICATIONS

Álvaro Parra Bustos et al., "Visual SLAM: Why Bundle Adjust?", arXiv:1902.03747v2 [cs.CV], Jun. 2019, 7 pages.

(Continued)

*Primary Examiner* — Zaihan Jiang
(74) *Attorney, Agent, or Firm* — Oblon, McClelland, Maier & Neustadt, L.L.P.

(57) ABSTRACT

According to one embodiment, a camera location estimation apparatus including a processor included to acquire map information indicating a map of a facility, acquire first locations of a moving object on the map indicated by the map information in response to movements of the moving object moving within the facility, acquire a plurality of images containing the moving object, the plurality of images being captured by a camera, and estimate a location of the camera on the map indicated by the map information so that each of the first locations of the moving object and a second location of the moving object on an image containing the moving object located at the first location among the plurality of images match with each other.

12 Claims, 6 Drawing Sheets

(56) References Cited

U.S. PATENT DOCUMENTS

| | | | | |
|---|---|---|---|---|
| 2009/0018768 | A1* | 1/2009 | Jo | G01S 19/34 |
| | | | | 701/465 |
| 2009/0085935 | A1* | 4/2009 | Yamashita | G06F 3/017 |
| | | | | 345/660 |
| 2009/0188800 | A1* | 7/2009 | Chachisvilis | G01N 27/44773 |
| | | | | 204/600 |
| 2012/0230589 | A1* | 9/2012 | Baba | G06F 16/7837 |
| | | | | 382/218 |
| 2015/0092226 | A1* | 4/2015 | Anderson | G06Q 10/06 |
| | | | | 358/1.15 |
| 2019/0149770 | A1* | 5/2019 | Oami | H04N 7/181 |
| | | | | 348/143 |
| 2019/0335077 | A1* | 10/2019 | Rieveschl | H04N 23/67 |
| 2020/0101621 | A1* | 4/2020 | Sato | G01S 17/88 |
| 2025/0087084 | A1* | 3/2025 | Kim | G08G 1/0141 |

OTHER PUBLICATIONS

"Cocobo, a Security Robot that Harmonizes with Public Spaces", SECOM Co., Ltd., Jan. 17, 2022, https://www.secom.co.jp/business/cocobo/, 73 pages (with English Translation).

"Launch of "People Flow Analysis Service" that Visualizes "People's Trajectories"—Visualizes Human Movements Captured Using Toshiba AI Technology and the Cloud and Supports Improvements", Toshiba Lighting & Technology Corporation, Nov. 29, 2021, https://www.tlt.co.jp/tlt/press_release/p211129/0211129.htm, 11 pages (with English Translation).

* cited by examiner

CAMERA LOCATION ESTIMATION APPARATUS, METHOD AND STORAGE MEDIUM

CROSS-REFERENCE TO RELATED APPLICATIONS

This application is based upon and claims the benefit of priority from Japanese Patent Application No. 2023-111588, filed Jul. 6, 2023, the entire contents of which are incorporated herein by reference.

FIELD

Embodiments described herein relate generally to a camera location estimation apparatus, a method and a storage medium.

BACKGROUND

It is known that various services are provided by utilizing a plurality of cameras installed (disposed) in facilities such as buildings, factories, commercial facilities, and the like.

For example, when multiple cameras are installed in multiple areas within a facility, it is possible to provide services for detecting human intrusion, congestion and the like within the area based on images of the area captured by each of the multiple cameras.

In order to provide the above-mentioned services, it is necessary to know the location of each of the multiple cameras installed in the facility.

It is considered that the location of each of the multiple cameras installed in the facility is manually checked and registered. When the number of cameras installed in a facility is large, such work requires a lot of manpower and time.

Therefore, there is a need to efficiently determine the locations of cameras installed in a facility.

DETAILED DESCRIPTION

In general, according to one embodiment, a camera location estimation apparatus for estimating a location of a camera installed in a facility, the apparatus including a processor included to acquire map information indicating a map of the facility, acquire first locations of a moving object on the map indicated by the map information in response to movements of the moving object moving within the facility, acquire a plurality of images containing the moving object, the plurality of images being captured by the camera, and estimate the location of the camera on the map indicated by the map information so that each of the first locations of the moving object acquired in response to the movements of the moving object and a second location of the moving object on an image containing the moving object located at the first location among the plurality of images match with each other.

Various embodiments will be described with reference to the accompanying drawings.

Figure 1:
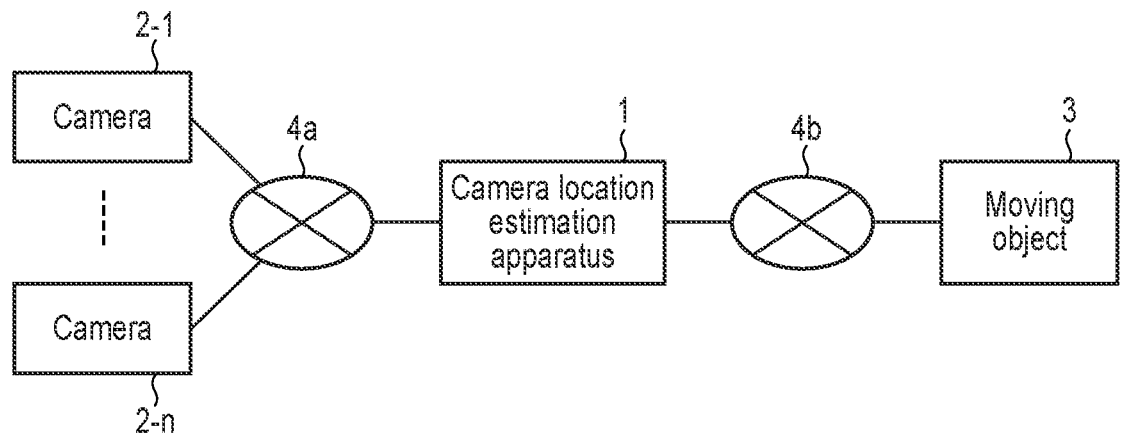
FIG. 1 is a diagram showing an example of a system configuration including a camera location estimation apparatus according to an embodiment.

FIG. 1 shows an example of a system configuration including a camera location estimation apparatus 1 of the embodiment.

The camera location estimation apparatus 1 is connected to each of n (n is an integer of 2 or more) cameras 2-1 to 2-$n$ via, for example, a network 4$a$. Each of the n cameras 2-1 to 2-$n$ is installed in a facility such as a building, factory, commercial facility or the like. It is assumed that the camera location estimation apparatus 1 is wired to each of the n cameras 2-1 to 2-$n$, but may be wirelessly connected to each of the n cameras 2-1 to 2-$n$.

Figure 2:
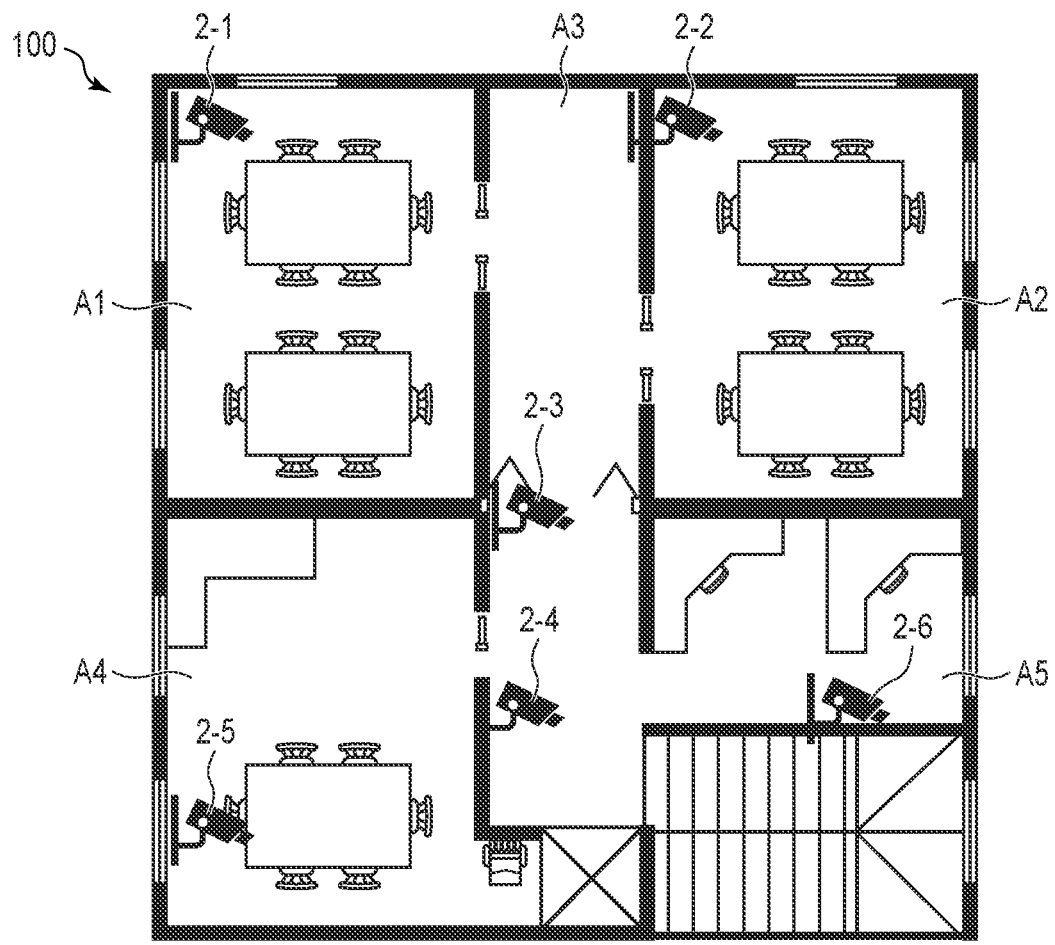
FIG. 2 is a diagram showing an example in which cameras are installed in a facility.

FIG. 2 shows such an example case that a plurality of cameras 2-1 to 2-$n$ are installed in a facility 100 including a plurality of areas A1 to A5 (for example, meeting rooms, hallways and the like). Note that FIG. 2 illustrates a case where six cameras 2-1 to 2-6 are installed in the facility 100.

In the facility 100 where the cameras 2-1 to 2-6 are installed as shown in FIG. 2, it is possible to provide a service for detecting human intrusion or congestion in ¬the areas A1 to A5, based on images captured by each of the cameras 2-1 to 2-6. Alternatively, by tracking the persons detected in each of the areas A1 to A5, such a service can be provided as well to detect (analyze) the amount of passer-by (human flow) or abnormal behavior of persons in each of the areas A1 to A5.

The cameras 2-1 to 2-$n$ in this embodiment may as well be used to provide services other than those described above. For example, when a plurality of cameras 2-1 to 2-$n$ are installed in a plurality of areas where products are sold in a facility, such a service can be provided that the purchasing behavior of a person moving in the areas, based on images of the areas captured by these cameras.

When a plurality of cameras 2-1 to 2-$n$ are installed in a plurality of areas of a facility (for example, a factory or the like), it is possible to provide such services of analyzing the human flow of operators moving between the plurality of areas within the facility, by using the cameras 2-1 to 2-$n$. Alternatively, it is possible to provide such services of analyzing the location and operating status of industrial robots or service robots (security robots, cleaning robots, transport robots, or guide robots and the like), by using the cameras 2-1 to 2-$n$. With such services, it is also possible to improve workers' productivity and the operational efficiency of industrial robots.

In the above-described services, it is necessary to know the location of each of the cameras 2-1 to 2-*n* in the facility in advance in order to identify the areas in the facility in the images used for analysis.

Generally, the location of each of the cameras 2-1 to 2-*n* is determined in advance based on design drawings of the facility or the like, and is manually registered (converted into data) in the above system. It is time-and-labor consuming to install cameras 2-1 to 2-*n* while checking the locations determined in advance.

Further, when the location of each of the cameras 2-1 to 2-*n* is not determined in advance, the cameras may be installed at some other available location within the facility. In that case, it is necessary to manually survey, confirm, and register the location where each of the cameras 2-1 to 2-*n* has been installed. This is also the case for such a case where cameras which have already been installed for other usages are converted (used) as cameras 2-1 to 2-*n*.

In some cases, the locations of cameras already installed for other usages can be determined from the design drawings of the facility or the like. However, if the locations of the cameras determined from the design drawings of the facility are floors or room numbers or the like where the cameras are installed, the accuracy of the locations of the cameras may be low, and the above-described services may not be realized.

As described above, in general, a number of operation steps (labor, cost, time and the like) are required to manually check and register the location of each of the cameras 2-1 to 2-*n*.

As a solution to the above-described drawback, as shown in FIG. 1, the camera location estimation apparatus 1 of this embodiment is communicatively connected via a network 4*b* to a moving object 3. The moving object 3 moves autonomously within a facility where the cameras 2-1 to 2-*n* are installed. Examples of the moving object 3 are a security robot, a cleaning robot, a transport robot and a guiding robot. It is assumed here that the camera location estimation apparatus 1 is wirelessly connected to the moving object 3, but may as well be wired to the moving object 3. The camera location estimation apparatus 1 may be connected to a plurality of moving objects, but in the following descriptions, it is assumed to be connected to one moving object.

The moving object 3 in this embodiment acquires the surrounding environmental information by using a sensor such as a camera, an infrared radar, a millimeter wave radar or the like. The surrounding environmental information is information such as the presence or absence of objects (for example, walls and obstacles) in the vicinity of the moving object, the distance between the moving object and the objects, and the like. Based on the environmental information, the moving object 3 creates map information indicating a floor plan (map) of the facility. The floor plan includes walls of the facility, travelable pathways within the facility, obstacles located within the facility and the like.

Further, based on the surrounding environmental information acquired by using the above-provided sensors, the moving object 3 moves while determining its own location on the map indicated by the map information. In the following descriptions, the location of the moving object 3 on the map indicated by the map information will be expressed as the "map location" of the moving object 3.

The camera location estimation apparatus 1 in this embodiment acquires images from each of the cameras 2-1 to 2-*n* via the network 4*a*. The camera location estimation apparatus 1 also acquires the map information and the map location (location information indicating the map location) of the moving object 3 in the facility via the network 4*b*. The camera location estimation device 1 automatically estimates the location of each of the cameras 2-1 to 2-*n* based on the above-described acquired information (the images from each of the cameras 2-1 to 2-*n*, the map information from the moving object 3 and the map location of the moving object 3).

Figure 3:
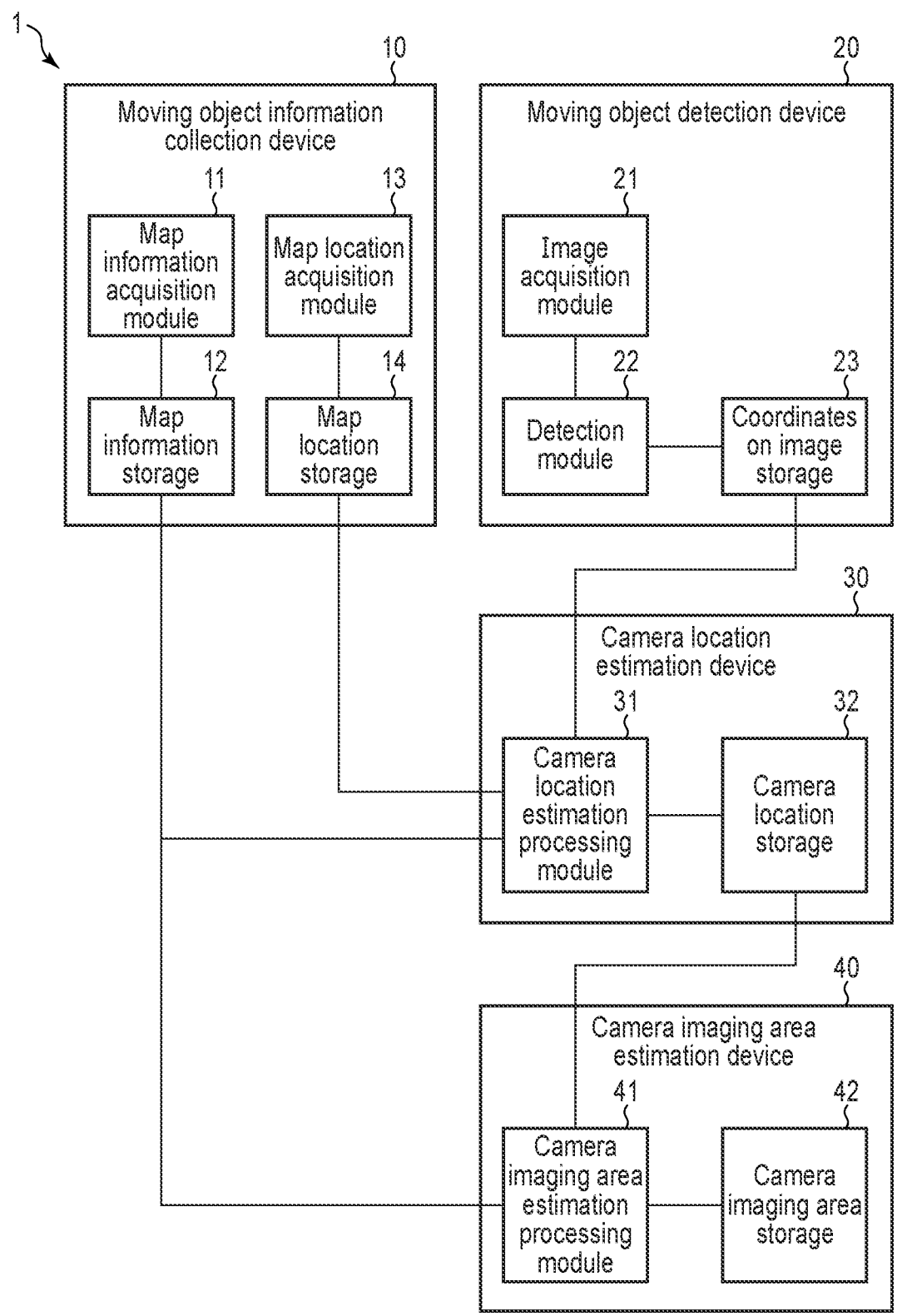
FIG. 3 is a diagram showing an example of a functional configuration of the camera location estimation apparatus according to the embodiment.

FIG. 3 shows an example of the functional configuration of the camera location estimation apparatus 1 of the embodiment. The camera location estimation apparatus 1 comprises a moving object information collection device 10, a moving object detection device 20, a camera location estimation device 30, and a camera imaging area estimation device 40.

The moving object information collection device 10 acquires (collects) and stores various types of information from the moving object 3. The moving object information collection device 10 includes a map information acquisition module 11, a map information storage 12, a map location acquisition module 13, and a map location storage 14.

The map information acquisition module 11 acquires map information generated by the moving object 3. The map information acquisition module 11 stores the acquired map information in the map information storage 12.

The map location acquisition module 13 acquires the map location of the moving object 3 in response to the movement of the moving object 3 within the facility. The map location acquisition module 13 stores the map location of the moving object 3 together with the time when the moving object 3 is at the map location, in the map location storage 14.

The moving object detection device 20 detects the moving object 3 on a plurality of images (frames) captured by each of the cameras 2-1 to 2-*n*, and acquires and stores actual coordinates on the images of the moving object 3 (the location of the moving object 3 on each of the images). The moving object detection device 20 includes an image acquisition module 21, a detection module 22, and a coordinates on image storage 23.

The image acquisition module 21 acquires (collects) a plurality of images captured by each of the cameras 2-1 to 2-*n* for each of the camera 2-1 to 2-*n*. The detection module 22 detects the moving object 3 contained in the images acquired by the image acquisition module 21. The detection module 22 detects the actual coordinates on the images of the moving object 3 (the location of the moving object 3 on the image). The detection module 22 stores the coordinates on the image of the moving object 3 in the coordinates on image storage 23 while mapping the coordinates on the image of the moving object 3 to information that identifies the image containing the moving object 3, which will be referred to as "image identification information" hereinafter. The image identification information contains camera identification information to identify the camera that captured the image, the time when the image was captured (image number set for the image) and the like.

The camera location estimation device 30 estimates and stores the location of each of the cameras 2-1 to 2-*n*, based on the map information, the map location of the moving object 3 and the actual coordinates on the image of the moving object 3. The camera location estimation device 30 includes a camera location estimation processing module 31 and a camera location storage 32.

The camera location estimation processing module 31 estimates the location of each of the cameras 2-1 to 2-*n* on the map indicated by the map information stored in the map information storage 12 based on the map locations of the moving object 3 stored in the map location storage 14 and the actual coordinates on the images of the moving object 3 stored in the coordinates on image storage 23. The location of each of the cameras 2-1 to 2-*n* is estimated based on the location where each of the map locations of the moving object 3 (that is, the map locations of the moving object 3 obtained by the moving object information collection module 10 in response to the movement of the moving object 3) and respective one of the actual coordinates on the images of the moving object 3 (that is, the actual coordinates on the images of the moving object 3 on the images containing the moving object 3 at the map locations among the images acquired by the moving object detection device 20 in response to the movement of the moving object) match each other. The camera location estimation processing module 31 performs such estimation processing for each of the cameras 2-1 to 2-*n*.

Note that, in addition to the location of each of the cameras 2-1 to 2-*n*, the camera location estimation processing module 31 further estimates the angle (installation angle) of each of the cameras 2-1 to 2-*n* as well. The camera location estimation processing module 31 stores the estimated location and angle of each of the cameras 2-1 to 2-*n* in the camera location storage 32.

The camera imaging area estimation device 40 estimates the camera imaging area of each of the cameras 2-1 to 2-*n*. The camera imaging area estimation device 40 includes a camera imaging area estimation processing module 41 and a camera imaging area storage 42.

The camera imaging area estimation processing module 41 estimates camera imaging areas of each of the cameras 2-1 to 2-*n*, based on the map information stored in the map information storage 12, view angle information which indicates the angle of view of the cameras 2-1 to 2-*n* held in advance, the location of each of the cameras 2-1 to 2-*n* stored in the camera location estimation storage 32, and the camera angle of each of the cameras 2-1 to 2-*n* stored in the camera location estimation storage 32. The camera imaging area estimation processing module 41 stores camera imaging area information indicating the camera imaging area of each of cameras 2-1 to 2-*n* in the camera imaging area storage 42.

Figure 4:
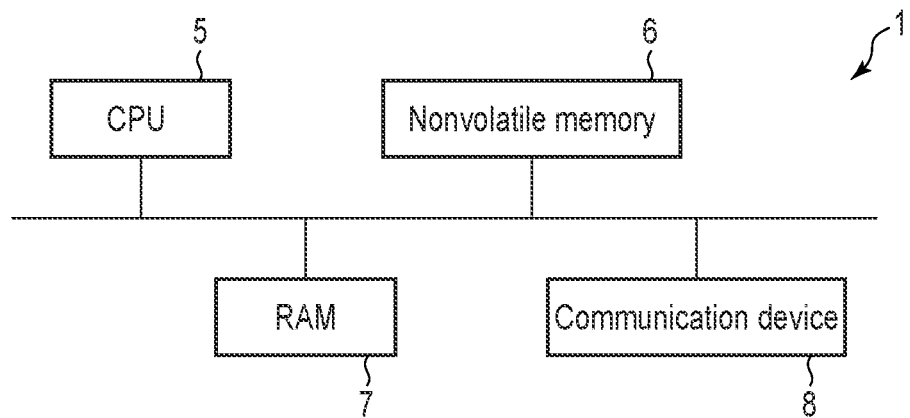
FIG. 4 is a diagram showing an example of a hardware configuration of the camera location estimation apparatus according to the embodiment.

FIG. 4 shows an example of the hardware configuration of the camera location estimation apparatus 1 of the embodiment. The camera location estimation apparatus 1 comprises, for example, a CPU 5, a nonvolatile memory 6, a RAM 7, a communication device 8 and the like.

The CPU 5 is a processor for controlling the operation of various components within the camera location estimation apparatus 1. The CPU 5 may be a single processor or may be constituted by a plurality of processors. The CPU 5 executes various programs that are loaded from the nonvolatile memory 6 into the RAM 7. These programs include an operating system (OS) and various application programs.

The nonvolatile memory 6 is a storage medium used as an auxiliary storage device. The RAM 7 is a storage medium used as the main storage device. FIG. 4 shows only the non-volatile memory 6 and the RAM 7, but the camera location estimation apparatus 1 may as well comprise other storage devices such as a hard disk drive (HDD) and a solid state drive (SSD), for example.

The communication device 8 is a device configured to perform wired or wireless communication. The camera location estimation apparatus 1 of the embodiment is connected to the cameras 2-1 to 2-*n* by a wire (cable), but it may be connected to perform wireless communication. In addition, it is assumed that the camera location estimation apparatus 1 is connected to the moving object 3 so as to execute wireless communication, but it may be connected to the moving object 3 by a wire (cable).

Note that in this embodiment, some or all of the map information acquisition module 11, the map location acquisition module 13, the image acquisition module 21, the detection module 22, the camera location estimation processing module 31, and the camera imaging area estimation processing module 41 shown in FIG. 3 are realized by making the CPU 5 execute a predetermined program, that is, by way of software. The program may be stored and distributed on a computer-readable storage medium, or may be downloaded to the camera location estimation apparatus 1 via a network. Note that some or all of the map information acquisition module 11, the map location acquisition module 13, the image acquisition module 21, the detection module 22, the camera location estimation processing module 31, and the camera imaging area estimation processing module 41 may be realized by dedicated hardware or the like or by a combination of software and hardware.

Further, in this embodiment, the map information storage 12, the map location storage 14, the coordinates on image storage 23, the camera location storage 32, and the camera imaging area storage 42 shown in FIG. 3 are realized by, for example, the nonvolatile memory 6 or some other storage device.

Figure 5:
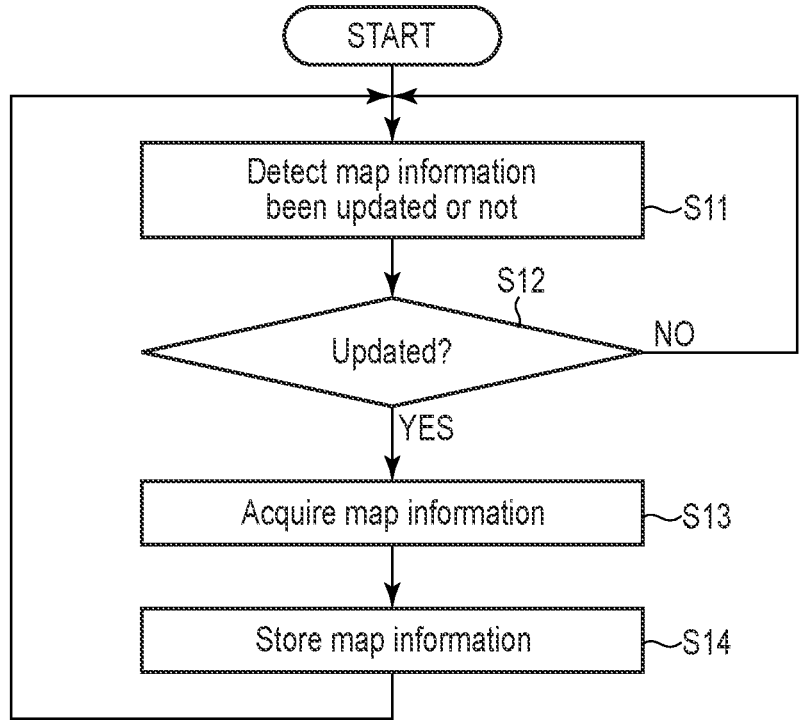
FIG. 5 is a flowchart showing an example of a procedure of processing a map information acquisition module according to the embodiment.

Next, with reference to the flowchart in FIG. 5, an example of the procedure of the map information acquisition process by the map information acquisition module 11 will be described.

The map information acquisition module 11 acquires map information generated by the moving object 3. The acquired map information is stored in the map information storage 12. Note that the map information generated by the moving object 3 is updated based on the surrounding environmental information acquired as the moving object 3 moves to a new area. In addition, the disposition of obstacles may change over time in the facility, and then the map information may be updated in response to such changes in the disposition of the obstacles.

Thus, the map information acquisition module 11 detects whether or not the map information has been updated by the moving object 3 (step S11). The process of step S11 is executed based on the difference between the map information held by the moving object 3 and the map information already stored in the map information storage 12. Note that the map information acquisition module 11 may as well detect that the map information has been updated when a notification indicating the updating of the map information is received from the moving object 3.

Next, the map information acquisition module 11 determines whether or not the map information has been updated based on the detection result obtained in step S11 (step S12).

When it is determined that the map information has not been updated (NO in step S12), the process is placed back to step S11, and repeated.

When determined that the map information has been updated (YES in step S12), the map information acquisition module 11 acquires the updated map information from the moving object 3 (step S13).

The map information acquisition module 11 stores the map information acquired in step S13 in the map information storage 12 (step S14). After that, the process returns to step S11 and the processing from this process on is repeated. In this way, the map information acquisition module 11 can periodically acquire the map information that reflects the current state of the facility (including the changes in the disposition of obstacles and the like), and store it in the map information storage 12. Note that the map information acquisition module 11 may as well periodically acquire the map information regardless of whether the map information is updated or not.

Figure 6:
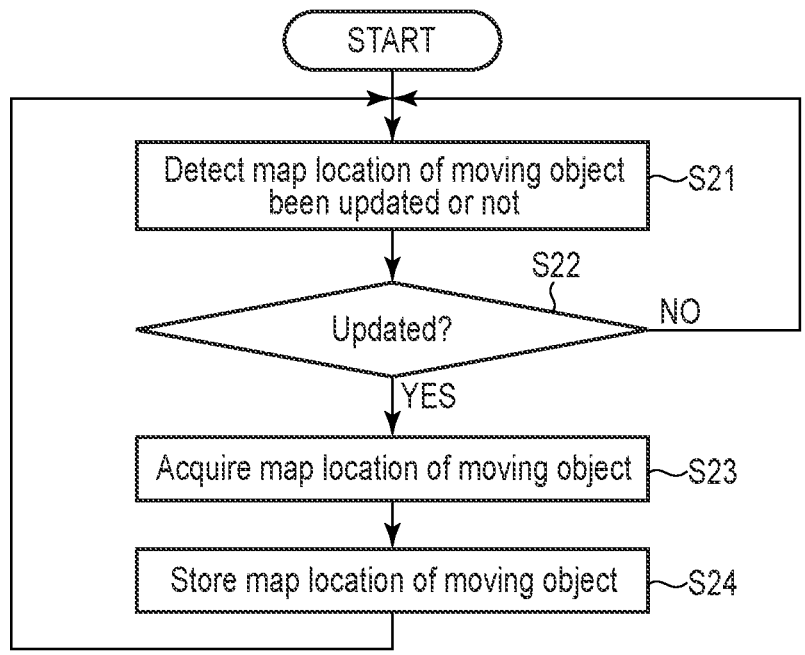
FIG. 6 is a flowchart showing an example of a procedure of processing of a map location acquisition module according to the embodiment.

Next, with reference to the flowchart in FIG. 6, an example of the procedure of the map location acquisition process by the map location acquisition module 13 will be described.

The map location acquisition module 13 acquires the map location of the moving object 3. The map location is a self-location on the map that is determined by the moving object 3. The map location acquisition module 13 stores the map location of the moving object 3 in the map location storage 14. Note here that the moving object 3 is moving within the facility, and therefore the map location of the moving object 3 need to be acquired in response to the movement of the moving object 3.

Therefore, the map location acquisition module 13 detects whether or not the map location of the moving object 3 has been updated (step S21). The process of step S21 is executed based on the difference between the self-location on the map, determined by the moving object 3 (the map location of the moving object 3) and the map location of the moving object 3 already stored in the map location storage 14 (the movement of the moving object 3). Note that the map location acquisition module 13 may detect that the map location has been updated when a notification of updating of the map location is received from the moving object 3.

Next, the map location acquisition module 13 determines whether or not the map information has been updated based on the detection result obtained in step S21 (step S22).

When it is determined that the map location of the moving object 3 has not been updated (that is, the moving object 3 has not moved) (NO in step S22), the process is placed back to step S21, and repeated.

When determined that the map location of the moving object 3 has been updated (that is, the moving object 3 has moved) (YES in step S22), the map location acquisition module 13 acquires the map location from the moving object 3 (step S23). The map location acquisition module 13 acquires the map location of the moving object 3 together with a time when the map location of the moving object 3 was updated (the time when the moving object 3 was at the map location).

The map location acquisition module 13 then stores the map location of the moving object 3 and the time so as to be associated with each other, in the map location storage 14 (step S24). After that, the process is periodically returned to step S21 and the processing from this one is repeated thereafter. As a result, each time the map location of the moving object 3 is updated (that is, in response to the movement of the moving object 3), the map location of the moving object 3 is stored in the map location storage 14. Note that the map location acquisition section 13 may as well periodically acquire the map location regardless of whether the map location is updated or not.

Figure 7:
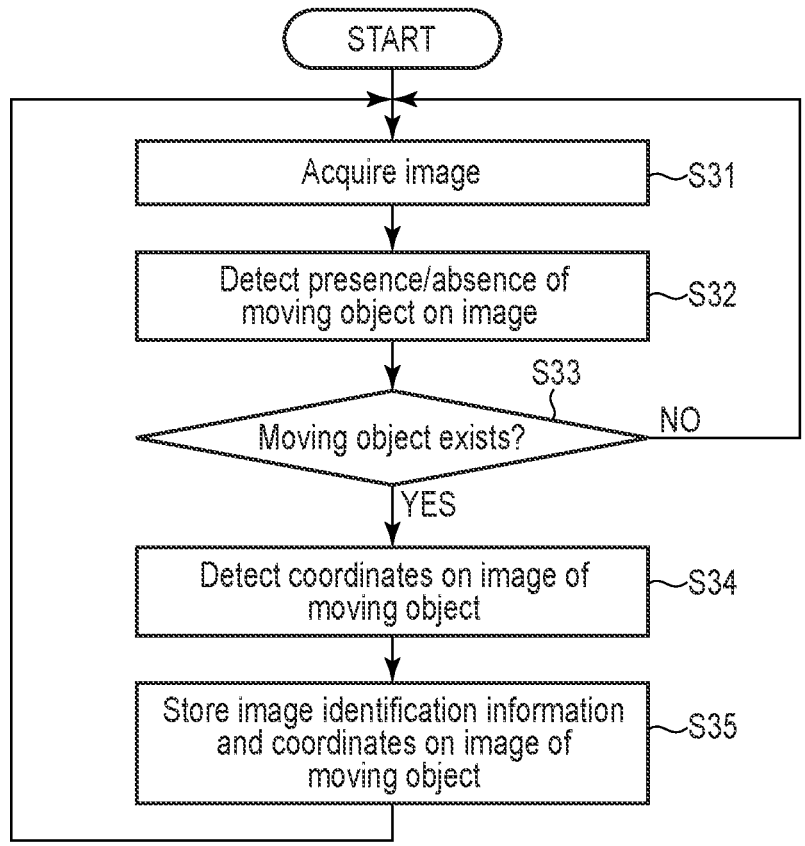
FIG. 7 is a flowchart showing an example of a procedure of processing a mobile object detection module according to the embodiment.

Next, with reference to the flowchart in FIG. 7, an example of the procedure of the moving object detection process by the moving object detection module 20 will be described. Note that the moving object detection device 20 performs the process of FIG. 7 for each of the cameras 2-1 to 2-*n* in parallel. Alternatively, the moving object detection device 20 may perform the processes in FIG. 7 for each of the cameras 2-1 to 2-*n* in a predetermined order. In the following descriptions, an example case where the processing is carried out on one of the cameras 2-1 to 2-*n*, namely, the camera 2-*i*, will be described.

The image acquisition module 21 of the moving object detection device 20 acquires an image captured by camera 2-*i* (step S31). The detection module 22 carries out analyzing process on the image acquired in step S31 to detect a presence or absence of the moving object 3 on the image (step S32).

Next, based on the detection result obtained in step S32, the image acquisition module 21 determines whether or not the moving object 3 exists in the image acquired in step S31 (that is, the moving object 3 is in the image) (step S33). In other words, the image acquisition module 21 determines whether or not the image contains the moving object 3.

When the image acquisition module 21 determines that the moving object 3 does not exist (is not contained) in the image (NO in step S33), the process is returned to step S31 and repeated.

When the image acquisition module 21 determines that the moving object 3 exists (is contained) in the image (YES in step S33), the detection module 22 detects the actual coordinates on the image of the moving object 3 (step S34). The actual coordinates on the image of the moving object 3 is represented by two-dimensional coordinate values when a predetermined location on the image is set at the origin. The detection module 22 acquires two-dimensional coordinate values of a predetermined characteristic point (for example, a top, bottom, center portion or the like) of the moving object 3 on the image as the actual coordinates on the image of the moving object 3.

The detection module 22 stores the actual coordinates on the image of the moving object 3 detected in step S34 in the coordinates on image storage 23, so as to be associated with the image identification information of the image in which the moving object 3 is contained (step S35). After that, the process is returned to step S31, and in the image captured by the camera 2-I, the processing from this one is repeated. Note that the process shown in FIG. 7 is assumed to be carried out on all images captured by the camera 2-*i*, but it may be carried out on some of the images. In this case, for example, the process shown in FIG. 7 may be carried out on one of the images for each predetermined number of images (that is, the process is carried out once in every few frames).

Next, with reference to the flowchart in FIG. 8, an example of a procedure of a camera location estimation process by the camera location estimation device 30 of this embodiment will be described. Note that the camera location estimation device 30 performs the process in FIG. 8 in parallel for each of the cameras 2-1 to 2-*n*. Alternatively, the camera location estimation device 30 may perform the process of FIG. 8 for each of the cameras 2-1 to 2-*n* in a predetermined order. In the following descriptions, an example case where the processing is performed for one of the cameras 2-1 to 2-*n*, namely, the camera 2-*i*, will be described.

The camera location estimation processing module 31 of the camera location estimation device 30 acquires the number of images containing the moving object 3 captured by the camera 2-*i* (step S41). More specifically, the camera location estimation processing module 31 acquires the number of actual coordinates on the images of the moving object 3 captured by the camera 2-*i*. The actual coordinates on the images of the moving object 3 are stored in the coordinates on image storage 23.

Next, the camera location estimation processing module 31 determines whether or not the number of images being acquired in step S41 is greater than or equal to a predetermined number (step S42).

When the number of images containing the moving object 3 is less than the predetermined number (NO in step S42), the camera location estimation processing module 31 returns its operation to step S41. Then, the camera location estimation processing module 31 repeats the process until the number of images containing the moving object 3 (that is, the number of actual coordinates on the images of the moving object 3 captured by the camera 2-$i$) is greater than or equal to the predetermined number.

When the number of images containing the moving object 3 is greater than or equal to the predetermined number (YES in step S42), the camera location estimation processing module 31 acquires, for each of the predetermined number or more of the images, the image identification information In addition, the camera location estimation processing module 31 acquires, from the coordinates on image storage 23, the actual coordinates on the images of the moving object 3 corresponding to the image identification information (step S43).

Further, the camera location estimation processing module 31 acquires the map information stored in the map information storage 12 and the map locations of the moving object 3 stored in the map locations storage 14 (step S44). The camera location estimation processing module 31 acquires the map locations of the moving object 3 based on the image identification information corresponding to each of the actual coordinates on the images of the moving object 3 being acquired in step S43. More specifically, the camera location estimation processing module 31 refers to the time when the image was captured contained in the image identification information corresponding to each of the actual coordinates on the images of the moving object 3. Then, the camera location estimation processing module 31 acquires the map location of the moving object 3 at the time (corresponding to the time).

Note that the map location of the moving object 3 is acquired in response to the movement of the moving object 3. Therefore, when the moving object 3 is temporarily stopped, the map location of the moving object 3 is not stored in the map location storage 14 while the moving object 3 is stopped. If the moving object 3 is captured while the moving object 3 is stopped, the map location of the moving object 3 at the time when the image was captured contained in the image identification information corresponding to the actual coordinates on the image of the moving object 3, may not be stored in the map location storage 14. In this case, the camera location estimation processing module 31 discards the image identification information stored in the coordinates on image storage 23 acquired in step S43 and the actual coordinates on the image of the moving object 3 corresponding to the image identification information as data not to be used (step S45). As a result of discarding of the image identification information (image identification information and the actual coordinates on the image of the moving object 3 corresponding to the image identification information) in step S45, there may be no or insufficient number of actual coordinates on the images of the moving object 3 to be processed. For that reason, the camera location estimation processing module 31 further determines whether there are the predetermined number or more of the image identification information obtained in step S43 and the actual coordinates on the images of the moving object 3 corresponding to the image identification information (step S46). When there are less than the predetermined number of the actual coordinates on the images of the moving object 3 (NO in step S46), the process is placed back to step S41 and repeated.

When there are greater than or equal to the predetermined number of the actual coordinates on the images of the moving object 3 (YES in step S46), the camera location estimation processing module 31 acquires a currently estimated location and angle of the camera 2-$i$, stored in the camera location storage 32 (step S47). Hereinafter, the currently estimated location and angle of the camera 2-$i$ are referred to as the "estimated camera location" and "estimated camera angle" of the camera 2-$i$, respectively. In the initial state (when the process of FIG. 8 is executed for the first time), an estimated camera location and an estimated camera angle of the camera 2-$i$, which are set arbitrarily, are stored in the camera location storage 32.

Note that the estimated camera location of the camera 2-$i$ stored in the camera location storage 32 in the initial state is any location on the map being indicated by the map information. Alternatively, the estimated camera location of the camera 2-$i$ stored in the camera location storage 32 in the initial state may be any location (for example, along a wall surface or a pillar) that is estimated to be possible to install the camera 2-$i$ within the facility based on the map indicated by the map information.

Next, the camera location estimation processing module 31 calculates out (estimates) an estimated coordinates on the image of the moving object 3 on the image captured by the camera 2-$i$ based on the map location of the moving object 3, on an assumption that the camera 2-$i$ is installed at the estimated camera location and the estimated camera angle (step S48). That is, the estimated coordinates on the image is the location of the moving object 3 on the image captured (or to be captured) by the camera 2-$i$ installed at the estimated camera location at the estimated camera angle when the moving object 3 is located at the map location acquired in step S44. The camera location estimation processing module 31 calculates out the estimated coordinates on the image of the moving object 3 for each of the map locations acquired in step S44.

The camera location estimation processing module 31 calculates out the difference between each of the estimated coordinates on the images of the moving object 3 and each of the actual coordinates on the images of the moving object 3 for each of the map locations acquired in step S44 (step S49). In other words, for each of the map locations acquired by step S44, the difference (so-called re-projection error) is calculated between the location of the moving object 3 on the image (the estimated coordinates on the image) when the moving object 3 at the map location is captured by the camera 2-$i$ installed at the estimated location at the estimated angle, and the location of the moving object 3 on the image (the coordinates on the image), which is obtained when the moving object 3 located at the map location is captured by the actual camera 2-$i$.

This difference is caused by the fact that the estimated camera location and the estimated camera angle are different from the actual camera location and the actual camera angle of the camera 2-$i$. Therefore, by adjusting (optimizing) the estimated camera location and the estimated camera angle so that this difference is reduced, the location and angle of the camera 2-$i$ that captured the moving object 3 at the map location can be calculated.

The camera location estimation processing module 31 estimates (calculates) the camera location and the camera angle of the camera 2-$i$ so as to reduce the difference (error) between the estimated coordinates on the image and the actual coordinates on the image of the moving object 3 for each map location of the moving object 3 (step S50). In other words, the camera location estimation processing module 31 estimates (calculates) the camera location and the camera angle of the camera 2-$i$ so as to match the estimated coordinates on the image and the actual coordinates on the image with each other. In this case, the camera location estimation processing module 31 executes a process to optimize the estimated camera location and the estimated camera angle of the camera 2-$i$ using, for example, the bundle adjustment method. Then, the camera location estimation processing module 31 estimates thus optimized estimated camera location as the camera location of the camera 2-$i$. The camera location estimation processing module 31 also estimates thus optimized estimated camera angle as the camera angle of the camera 2-$i$.

The camera location estimation processing module 31 stores (updates) the camera location and the camera angle of the camera 2-$i$ estimated in the step S50 in the camera location storage 32 (step S51).

The camera location estimation processing module 31 calculates out once again an estimated coordinates on the image of the moving object 3 by using the camera location and the camera angle of the camera 2-$i$ stored in step S51 as the estimated location and estimated angle. The camera location estimation processing module 31 calculates out a total difference value between the estimated coordinates on the images and the actual coordinates on the images as to the map locations acquired by step S44. Then, the camera location estimation processing module 31 determines whether the total difference value is less than or equal to a threshold value (step S52).

When the total difference value between the estimated coordinates on the image and the actual coordinates on the image of the moving object 3 is not less than or equal to the threshold value (NO in step S52), the accuracy of the camera location and the camera angle of the camera 2-$i$ being estimated in step S50 may be low (the difference between the estimated camera locations and the actual camera locations may be large). In this case, the operation is returned to step S41 and the processing of steps S41 to S52 is repeated again using other images captured by the camera 2-$i$. When the total difference value between the estimated coordinates on the image and the actual coordinates on the image is less than or equal to the threshold value (YES in step S52), the process is terminated.

Figure 8:
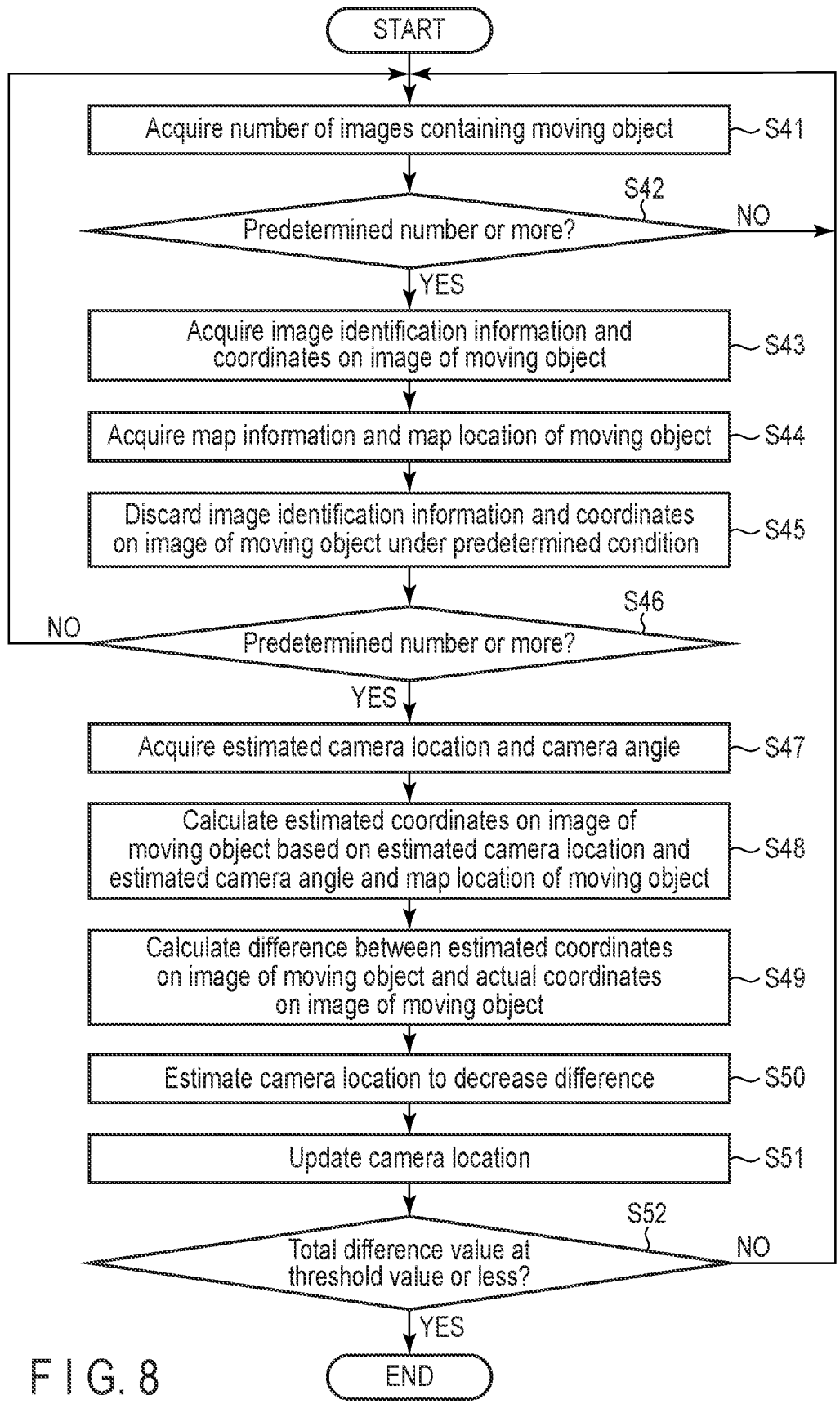
FIG. 8 is a flowchart showing an example of a procedure of processing a camera location estimation device according to the embodiment.
Figure 9:
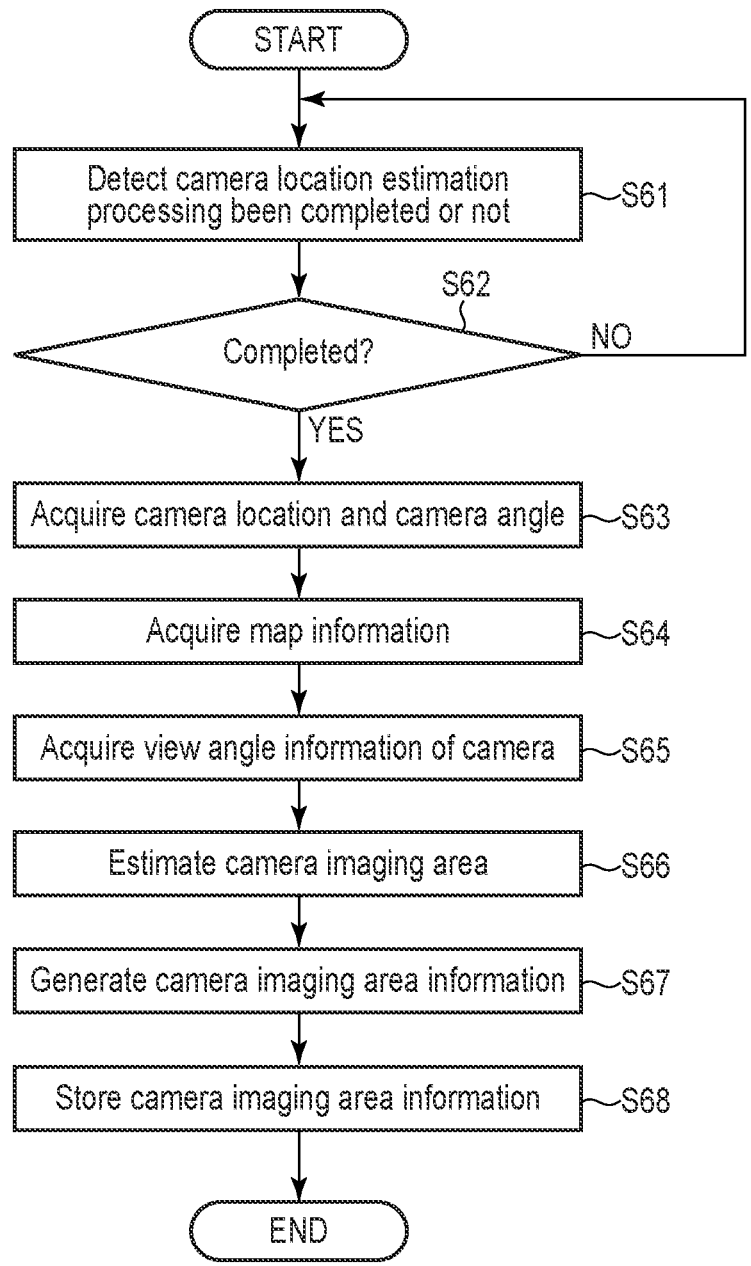
FIG. 9 is a flowchart showing an example of a procedure of processing camera imaging area estimation module according to the embodiment.

Note that the camera location of the camera 2-$i$ estimated by the camera location estimation process shown in FIG. 8 is, for example, a location in three-dimensional space, but the location information which is finally stored in the camera location storage 32 after completing the process in FIG. 8 and the process in FIG. 9, which will be discussed later, may be a two-dimensional planar location or a three-dimensional special location.

Note further that the camera location estimation processing module 31 may omit the processing of steps S41 and S42. In this case, the camera location estimation processing module 31 may determine whether the number of image identification information after discarding the image identification information under the predetermined condition (that is, the number of the image identification information for which the corresponding map location of the moving object 3 stored in the map location storage 14) reaches or exceeds the predetermined number.

Furthermore, if, in step S44, the map location of the moving object 3 at the time in that the image contained in the image identification information corresponding to the actual coordinates on the image of the moving object 3 was captured is not stored in the map location storage 14, the camera location estimation processing module 31 may acquire the map location of the moving object 3 at the nearest time (immediately before) among the map locations of the moving object 3 that were updated before the time in that the image contained in the image identification information corresponding to the coordinates on the image of the moving object 3 was captured. In this case, the processing of steps S45 and S46 can be omitted.

Next, with reference to the flowchart in FIG. 9, an example of the procedure of the camera imaging area estimation process by the camera imaging area estimation device 40 of this embodiment will be described. Note that the camera imaging area estimation device 40 performs the process shown in FIG. 9 for each of the cameras 2-1 to 2-$n$ in parallel. Alternatively, the camera imaging area estimation device 40 may perform the processes in FIG. 9 for each of the cameras 2-1 to 2-$n$ in a predetermined order. In the following descriptions, an example in which the processing is carried out for one of the cameras 2-1 to 2-$n$, namely, the camera 2-$i$, will be described.

First, the camera imaging area estimation processing module 41 of the camera imaging area estimation device 40 detects whether or not the camera location estimation processing shown in FIG. 8 for the camera 2-$i$ has been completed (step S61). Note that the camera imaging area estimation processing module 41 may detect that the camera location estimation processing has been completed when the camera imaging area estimation processing module 41 receives a complete notification from the camera location estimation device 30. The complete notification indicates that the camera location estimation process for the camera 2-$i$ has been completed. Alternatively, the camera imaging area estimation processing module 41 may detect whether the camera location estimation process has been completed by periodically checking whether the location and angle of the camera 2-$i$ in the camera location storage 32 have been updated.

Next, based on the detection result obtained in step S61, the camera imaging area estimation processing module 41 determines whether or not the camera location estimation process has been completed (step S62).

When it is determined that the camera location estimation process has not been completed (NO in step S62), the operation is returned to step S61 and repeated.

When it is determined that the camera location estimation process has been completed (YES in step S62), the camera imaging area estimation processing module 41 acquires the camera location and the camera angle of the camera 2-$i$ estimated by the camera location estimation processing module 31 from the camera location storage 32 (step S63).

Further, the camera imaging area estimation processing module 41 acquires map information from the map information storage 12 (step S64). The camera imaging area estimation processing module 41, furthermore, acquires a view angle information indicating the angle of view of the camera 2-$i$ (step S65).

The view angle information contains the angle of view and distortion parameters of the camera 2-$i$. The view angle information is contained within camera parameters defined as specifications of the camera 2-$i$. The camera parameters are, for example, entered in advance when the camera 2-$i$ is installed by a user. The camera parameters are stored in a memory module in the camera location estimation apparatus 1, which is not shown in the figure. Alternatively, the camera parameters may be sent from the camera 2-$i$ when the camera location estimation apparatus 1 is connected to the camera 2-$i$, and then the camera parameters are stored in a memory module in the camera location estimation apparatus 1, which is not shown in the figure. The camera imaging area estimation processing module 41 refers to the camera parameters in the above-mentioned memory unit. Then the camera imaging area estimation processing module 41 acquires the view angle information of the camera 2-*i*.

Based on the map information, the view angle information of the camera 2-*i*, and the camera location and the camera angle of the camera 2-*i* estimated by the camera location estimation device 30, the camera imaging area estimation processing module 41 estimates the area to be captured (camera imaging area) by the camera 2-*i* installed at the location and angle (step S66).

Then, the camera imaging area estimation processing module 41 generates the camera imaging area information in which the camera imaging area of the camera 2-*i* is mapped on the map indicated by the map information (step S67). The camera imaging area estimation processing module 41 stores the camera imaging area information in the camera imaging area storage 42 (step S68). According to such camera imaging area information, for example, it is possible to display a map with a color assigned to an area indicating the camera imaging area of the camera 2-*i*, thereby enabling to visually determine the camera imaging area and the like.

Note that in this embodiment, the camera angle is estimated in addition to the camera locations of the cameras 2-1 to 2-*n*. But, for example, when the angles of the cameras 2-1 to 2-*n* are known (fixed values), only the camera locations of the cameras 2-1 to 2-*n* may be estimated. Further, if there is no need to estimate the camera imaging areas of the cameras 2-1 to 2-*n*, the camera location estimation apparatus 1 may do not include the camera imaging area estimation device 40. That is, the process shown in FIG. 9 may be not performed.

Incidentally, this embodiment is described as the case where the camera imaging area information is generated, but, for example, the camera location estimation processing module 31 may generate camera location information in which the camera location (and the camera angle) of the camera 2-*i* to 2-*n* is mapped on a map indicated by the map information. With such camera location information, for example, it is possible to display the camera location (and camera angle) of each of the cameras 2-1 to 2-*n*, estimated by the camera location estimation processing module 31 on the map, and thus the location of each of the cameras 2-1 to 2-*n* can be visually determined.

Further, in the above-provided descriptions, the explanation is directed to the case where a plurality of cameras 2-1 to 2-*n* are installed in a facility, but the number of the cameras need only be one or more.

As described above, the camera location estimation apparatus 1 in this embodiment acquires map information indicating the map of the facility, acquires the map locations (first locations) of the moving object 3 on the map indicated by the map information in response to movements of the moving object 3 within the facility, acquires a plurality of images containing the moving object 3 being captured by the camera, and estimates the location of the camera on the map indicated by the map information so that each of the map locations of the moving object 3 acquired in response to the movement of the moving object 3 and each of the actual coordinates on the images (second locations) of the moving object 3 on the images that contains the moving object 3 located at that map location among the plurality of images match with each other. Note that when a plurality of cameras 2-1 to 2-*n* are installed in the facility, the locations of the cameras 2-1 to 2-*n* are estimated for each of the cameras 2-1 to 2-*n*.

With this configuration, the locations of the cameras installed in a facility can be efficiently determined (estimated). When there are a great number of cameras installed in a facility, when such cameras are installed in a facility of a remote place, or when such cameras are installed in a location inaccessible to operators, or the like, a great deal of operation is required to determine the locations of the cameras. According to this embodiment, the above-described operation can be reduced even in the above-listed cases, and the locations of the cameras can be efficiently determined.

In this embodiment, the configuration of "estimating the location of a camera so that each of the map locations of the moving object 3 and the coordinates on the image of the moving object 3 match with each other" can be realized, for example, by the following procedure. That is, when it is assumed that the camera is installed at the estimated camera location (third location) on the map indicated by the map information, the estimated coordinates on the image (fourth location) of the moving object 3 on the image captured by the camera is calculated based on the map location of the moving object 3. Then, the difference between the actual coordinates on the image of the moving object 3 on the image containing the moving object 3 which is located at the map location and the estimated coordinates on the image is calculated for each map location. Then, the camera location (fifth location) is estimated so as to reduce the difference calculated for each of the map locations.

Note here that the location of the camera at which each of the map locations of the moving object 3 and each of the actual coordinates on the images of the moving object 3 match with each other may be estimated by a method other than those described above. For example, the location of the cameras at which each of the map locations and each of the actual coordinates on the images match with each other may be selected from a plurality of candidates for the locations of cameras on the map indicated by the map information (hereinafter referred to as candidate locations). In this case, the candidate locations of the cameras are set at locations in the facility, which are estimated as that cameras can be installed (for example, along wall surface or pillar). Then, the estimated coordinates on the image of the moving object 3 may be calculated for each of the candidate locations of the cameras, and the candidate locations of the cameras at which the difference between the estimated image location and the image location is at minimum (that is, each of the map location and the actual coordinates on the image of the moving object 3 match at the most with each other) may be estimated as the locations of the cameras.

Further, in this embodiment, an estimation of the location of a camera at which each of the map locations of the moving object 3 and each of the actual coordinates on the images of the moving object 3 match with each other, but it may as well be possible to estimate the location of a camera such that a movement path of the moving object 3 on the map and a movement track of the moving object 3 on the image match with each other. Even in this case, when assuming that the camera is installed at the estimated camera location on the map being indicated by the map information, an estimated movement track of the moving object 3 on an image which is captured by the camera is calculated based on the movement path of the moving object 3 on the map. Then, the difference between the movement track of the moving object 3 on the image containing the moving object 3 located on the movement track and the calculated estimated movement track of the moving object 3 on the image may be calculated to estimate the location of the camera such that the difference is reduced, as in the case of the present embodiment.

This embodiment is directed to the case where there is only one moving object 3 in a facility, but there may be a plurality of moving objects 3 in a facility. In this case, it is necessary to acquire the map location for each of these moving objects and detect the location on the image (actual coordinates on the image) for each of the plurality of moving objects. The case where a plurality of moving objects 3 exist in a facility will now be described.

The map information acquisition module 11 included in the moving object information collection device 10 shown in FIG. 3 acquires map information from each of the plurality of moving objects 3. The map information which is acquired at this time may differ for each of the plurality of moving objects 3. In this case, the map information acquisition module 11 may perform a process to integrate multiple map information acquired from each of the moving objects 3 whose map information has been updated. Note that when the moving objects 3 are moving on the same pathway within the facility, the map information from the moving object whose time when the map information was updated is latest may be stored in the map information storage 12. That is, the most recent map information from those of each of these moving objects 3 may be stored. Further, the map location acquisition module 13 acquires and stores the map location for each of the plurality of moving objects 3.

The detection module 22 included in the moving object detection device 20 identifies which of the plurality of moving objects 3 detected from the image is the moving object 3. Then, the detection module 22 acquires information identifying the moving object 3 (hereinafter referred to as moving object identification information). Note that the moving object identification information may be acquired based on, for example, a characteristic amount and of each of the moving objects 3 extracted by image processing, or it may be acquired by some other method. More specifically, each of the moving objects 3 may be identified by reading a code such as a QR code (registered trademark) attached to the moving object 3. Further, each of the moving objects 3 may as well be identified by using a signal (Bluetooth (registered trademark), Wi-Fi (registered trademark), or the like) transmitted from the moving object 3. In this case, each of the moving objects 3 may be identified (by analogy) based on a strength of the signal transmitted from the moving objects 3, for example. Further, it is also possible to identify each of the moving objects 3 by analyzing the unique sound or the like emitted by each of the moving objects 3.

The detection module 22 stores the actual coordinates on the image of the moving object 3 together with the acquired identification information in the coordinates on image storage 23, while associating it with the image identification information. Note that the above-provided descriptions are directed to the assumption that the detection module 22 acquires the moving object identification information, but the moving object identification information may be acquired by some other functional module such as a specific module different from the detection module 22.

By storing the moving object identification information together with the actual coordinates on the image, the camera location estimation processing module 31 included in the camera location estimation device 30 can estimate the location of the camera using the actual coordinates on the image for each of the moving objects 3.

Note that the camera location estimation apparatus 1 may be connected to a management system (or control system) that manages the movement and the like of one or more moving objects 3. In this case, the map information acquisition module 11 may acquire map information generated by one or more moving objects 3 from the management system. Alternatively, the map information acquisition module 11 may acquire map information generated by the management system (integrating map information from a plurality of moving objects 3). Further, the map location acquisition module 13 may acquire the map location of one or more moving objects 3 from the management system.

According to at least one of the embodiments described above, it is possible to provide a camera location estimation apparatus, method and program that can efficiently determine a location of a camera installed in a facility.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera location estimation apparatus for estimating a location of a camera installed in a facility, the apparatus comprising:
 a processor configured to:
  acquire map information indicating a map of the facility;
  acquire first locations of a moving object on the map determined by the moving object in response to movements of the moving object moving within the facility;
  acquire a plurality of images containing the moving object, the plurality of images being captured by the camera; and
  estimate the location of the camera on the map indicated by the map information so that each of the first locations of the moving object on the map acquired in response to the movements of the moving object and second locations of the moving object on images containing the moving object located at the first locations on the map among the plurality of images match with each other.

2. The camera location estimation apparatus of claim 1, wherein
 the processor is configured to
  calculate, on an assumption that the camera is installed at a third location on the map indicated by the map information, fourth locations of the moving object on images captured by the camera installed at the third location based on each of the first locations of the moving object on the map,
  calculate differences between the second locations of the moving object on the image containing the moving object located at each of the first locations on the map and the fourth locations on the images calculated for each of the first locations on the map, and
  estimate a fifth location of the camera at which the differences calculated for each of the first locations on the map are decreased.

3. The camera location estimation apparatus of claim 2, wherein the processor is configured to estimate the fifth location of the camera by bundle adjustment.

4. The camera location estimation apparatus of claim 1, wherein
the processor is configured to
calculate, on an assumption that the camera is installed at a third location on the map indicated by the map information and is installed at a first angle, a fourth location of the moving object on an image captured by the camera based on each of the first locations of the moving object on the map,
calculate differences between the second locations of the moving object on the image containing the moving object at each of the first locations on the map and the fourth locations on the image calculated for each of the first locations, and
estimate a fifth location and a second angle of the camera at which the difference calculated for each of the first locations on the map is decreased.

5. The camera location estimation apparatus of claim 4, wherein
the processor is configured to estimate a camera imaging area of the camera based on the map information, view angle information indicating an angle of view of the camera held in advance, the estimated fifth location and second angle of the camera.

6. The camera location estimation apparatus of claim 5, wherein
the processor is configured to generate camera imaging area information in which the camera imaging area of the camera is mapped on the map indicated by the map information.

7. The camera location estimation apparatus of claim 1, wherein
the processor is configured to acquire the map information from the moving object or a management system that manages the moving object.

8. The camera location estimation apparatus of claim 1, wherein
the processor is configured to acquire the first locations of the moving object on the map from the moving object or a management system that manages the moving object.

9. The camera location estimation apparatus of claim 1, wherein
when a plurality of cameras are installed in the facility, locations of the cameras are estimated for each of the cameras.

10. The camera location estimation apparatus of claim 1, wherein
the processor is configured to
calculate, on an assumption that the camera is installed at a third location on the map indicated by the map information, fourth locations of the moving object on images captured by the camera installed at the third location based on each of the first locations of the moving object on the map, and
calculate differences between the second locations of the moving object on the image containing the moving object located at each of the first locations on the map and the fourth locations on the images calculated for each of the first locations on the map.

11. A method executed by a camera location estimation apparatus for estimating a location of a camera installed in a facility, the method comprising:
acquiring map information indicating a map of the facility;
acquiring first locations of a moving object on the map determined by the moving object in response to movements of the moving object moving within the facility;
acquiring a plurality of images containing the moving object, the plurality of images being captured by the camera; and
estimating the location of the camera on the map indicated by the map information so that each of the first locations of the moving object on the map acquired in response to the movements of the moving object and second locations of the moving object on images containing the moving object located at the first locations on the map among the plurality of images match with each other.

12. A non-transitory computer-readable storage medium having stored thereon a program which is executed by a computer of a camera location estimation apparatus for estimating a location of a camera installed in a facility, the program comprising instructions capable of causing the computer to execute functions of:
acquiring map information indicating a map of the facility;
acquiring first locations of a moving object on the map determined by the moving object in response to movements of the moving object moving within the facility;
acquiring a plurality of images containing the moving object, the plurality of images being captured by the camera; and
estimating the location of the camera on the map indicated by the map information so that each of the first locations of the moving object on the map acquired in response to the movements of the moving object and second locations of the moving object on images containing the moving object located at the first locations on the map among the plurality of images match with each other.

* * * * *